United States Patent Office.

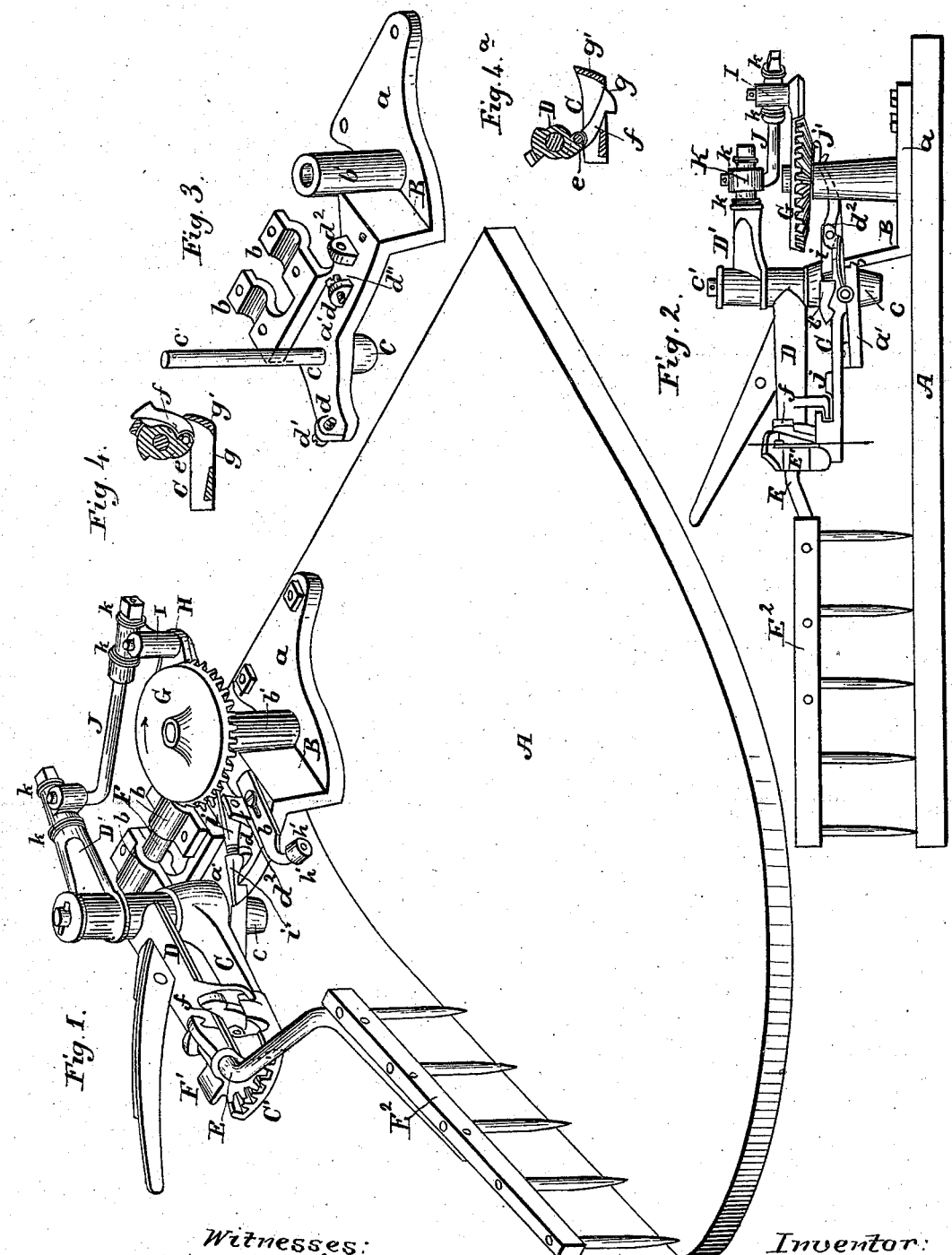

JOSEPH DICK, JR., OF OSHAWA, ONTARIO, ASSIGNOR TO HIMSELF AND EUGENE GLEN, OF ROCHESTER, NEW YORK.

Letters Patent No. 83,610, dated November 3, 1868; patented in Canada, June 26, 1868.

IMPROVEMENT IN HARVESTER-RAKES.

The Schedule referred to in these Letters Patent and making part of the same.

*To all whom it may concern:*

Be it known that I, JOSEPH DICK, Jr., formerly of Canton, Stark county, Ohio, but now residing in Oshawa, Ontario county, in the Province of Ontario, have invented certain new and useful Improvements in Harvester-Rakes; and I do hereby declare the following to be a full, clear, and exact description of the same, reference being had to the accompanying drawing, making a part of this specification, in which—

Figure 1 is a perspective view, taken from the rear grain-side of the platform, and showing the rake in the position it occupies at the end of its discharge or delivery-stroke and before rising for the return-stroke;

Figure 2 is a side elevation of the same;

Figure 3 is a perspective view of the bed-plate detached; and

Figures 4 4ª are detached views, showing the operation of the rake-latch hereinafter described.

Similar letters of reference denote corresponding parts in all the figures.

My invention relates to that class of rakes known as vibrating or sweep-rakes, and consists in certain improvements in details of construction and arrangement of parts of the rake which, in its general or characteristic features, resembles that for which Letters Patent were granted to me, January 28, 1868, and upon improvements of which the present application is based.

The nature and objects of said improvements will be best understood from the following description, with reference to the figures of the drawing, in which—

A represents a quadrant platform, which is to be connected with the finger-beam of a reaper in any usual or desired manner, and the outer or grain-side of which is curved in the arc of a circle, of which the rake-pivot is the centre, or otherwise made to conform substantiallly to the path described by the outer end of the rake in passing over the same.

B is an angular bed-plate bolted or otherwise secured to the inner front corner of the platform or inner end of the finger-beam, or beam and platform, as may be preferred. Said bed-plate is represented in the detached view, fig. 3, and is composed of or provided with the lower flange or base, $a$, which rests upon and is bolted to the finger-beam or platform, an elevated table, $a'$, bearings $b$ $b'$, for the driving and bevel or crank-wheel shafts, rake-pivot $c$, stop and latch-lugs $d$ $d$ and $d^2$, all formed upon or otherwise connected therewith, for purposes hereinafter explained.

The rake-pivot $c$ has mounted upon it the vibrating sector-arms C and tubular carrying-arm D, the former provided at its outer or swinging end with a toothed sector, C', and the latter carrying or having mounted in it the rake-stale or arm E, which is armed with a segment-pinion, E¹, the teeth of which engage with and travel over those of the sector-arm for imparting the necessary rising and falling movements to the rake-head E² in a manner that has been fully explained in the patent referred to.

D' is a heel-extension of the tubular arm D, to which the pitman which vibrates the rake is connected, as hereinafter described.

The outer end of arm D is provided with a lug or lugs, $e$, in which is pivoted one end of a latch, $f$, the opposite or free end of which rests upon the sector-arm, or enters a slot, $g$, therein, and, when engaged with the sector-arm, serves to latch or lock the rake-arm in its elevated position, and to prevent any movement of the tubular carrying-arm relative to the sector-arm during the return-stroke of the rake.

A friction-roller, $h'$, on the end of a slotted adjustable arm, $h$, serves to lift the latch $f$ out of its socket or slot, $g$, at the proper instant to allow the rake to descend upon the forward edge of the platform, when the inclined end of the latch rises readily and easily over the inclined way or plane $g'$, which sustains the latch in the elevated position shown in fig. 4, and insures its proper return to its locking-position, fig. 4ª, when the rake is again raised for its return-stroke.

The adjustability of roller-arm $h$ enables the attendant to regulate or effect the release of the rake at the desired point, viz, just as it is completing its return or forward stroke, and in such manner that the forward movement shall terminate and the discharge or delivery-stroke shall begin the instant the rake reaches the platform.

The throw of the sector-arm C is regulated by set-screws, $d'$ $d''$, in the lugs or ears, $d$ $d$, of the base-plate B.

$i$ is a latch-lever pivoted in lug $d^2$ on the bed-plate, and provided at its rear end with an adjustable latch-head or hook, $i$, which engages with a lug or ear, $j$, on the sector-arm C, at the instant the latter completes its forward or return-movement, and reaches the regulating-stop or set-screw $d''$, and serves to hold said arm C against any backward movement until the tubular carrying-arm D has completed its forward movement, travelling over the sector-arm, and the rake has thereby been caused to descend upon the platform, at which instant the latch is raised, and the sector-arm released by means of a lug or cam, J', on the lower face of the bevel and crank-wheel, striking upon and depressing the curved-heel extension of latch-lever $i$, thereby leaving the rake and its carrying-arms C and D free for their delivery-movement.

The driving-shaft F, mounted in bearings, $b$ $b$, of the bed-plate B, is designed to be connected, by a tumbling sliding extension, with driving-mechanism on the main frame of the machine, in such manner as to adapt it to operate in connection with a hinged platform and finger-beam.

The outer or platform-end of said shaft is armed with a bevel-pinion, which engages with and drives the bevel-wheel G, the shaft of which has its bearings in the base-plate B, at $b'$. Said wheel is provided on its upper face with the crank-arm H, upon which is mounted a tubular crank-box, I, one arm of which embraces the pitman J, and is made adjustable thereon, for varying the length of the pitman, by means of washers, $k$, which may be transferred from one side of the box to the other, or by means of jam-nuts, as may be preferred.

The opposite end of pitman J is connected to the heel-extension, D', of tubular carrying-arm D by means of a box, K, also made adjustable, and in a similar manner, for the purpose of varying the throw of the rake-head, as desired.

It will be seen from the drawings that the rake-pivot is located on the base-plate, in rear of the driving and crank-wheel shaft, at a point on the main-frame side of the latter.

The connection of the rake with the driving-crank is made through a heel or outward extension of the rake-carrying arm, as described, and the relation of parts is such that the crank passes one of its centres just after the rake has completed its delivery-stroke, and has been raised and locked for its return-stroke, and the other after it has completed its return-stroke and when the rake is descending upon the platform into position for its discharge-movement; and the movement of the crank being in the direction indicated by the arrow, fig. 1, the position of the pitman, and the path of movement of the crank-arm at the instant the crank passes its last-named centre, are approaching a right angle to the heel D, and a direct action of the crank is consequently attained just at that point in the movement of the rake where the greatest amount of power and the highest velocity of movement of the rake are required; and when the crank is passing its centres it is relieved of all weight or movement that would obstruct it, the weight of the rake, in descending upon the platform, serving rather to assist than retard the movement of the crank in passing the centre last above described.

Parts of the rake not particularly described may be constructed as described in the patent above referred to, or in any other desired form and manner.

Having now described my improvement in harvester-rakes,

What I claim as new, and desire to secure by Letters Patent, is—

1. The bed-plate B, provided with bearings for the driving and crank-wheel shafts and rake-pivot, and for the adjustable stops and rake-latch, arranged substantially as described.

2. The latch $f$, attached to the rake-carrying arm, and operating in connection with the sector-arm, substantially as described.

3. The adjustable roller-arm, in combination with the latch $f$, for releasing the same, in the manner set forth.

4. The pivoted latch-lever $i$, operating in combination with the sector and rake-carrying arms, substantially as described.

5. The pivoted latch-lever $i$, provided with the adjustable latch or hook, for the purpose set forth.

6. The pitman J and boxes I and K, in combination with the adjustable washers or jam-nuts $k$, arranged and operating substantially as described.

7. The vibrating rake-arm, provided with the heel-extension or counter-arm D', in combination with the crank-wheel shaft, arranged and operating in relation thereto, substantially as described.

In testimony whereof, I hereunto set my hand, this 7th day of September, 1868.

JOSEPH DICK, Jr.

Witnesses:
S. B. FAIRBANKS, *of Oshawa.*
C. W. SMITH, *of Oshawa.*